United States Patent [19]

Giachino et al.

[11] Patent Number: 4,647,013
[45] Date of Patent: Mar. 3, 1987

[54] SILICON VALVE

[75] Inventors: Joseph M. Giachino, Farmington Hills; James W. Kress, Dearborn, both of Mich.

[73] Assignee: Ford Motor Company, Dearborn, Mich.

[21] Appl. No.: 703,962

[22] Filed: Feb. 21, 1985

[51] Int. Cl.[4] ............................. F16K 7/14; B05B 1/02
[52] U.S. Cl. ................... 251/331; 251/129.06; 251/368; 239/102.2
[58] Field of Search ................ 239/102, 533.1, 533.15; 251/61.1, 331, 129.06, 368

[56] References Cited

U.S. PATENT DOCUMENTS

| 3,424,063 | 1/1969 | Norwood | 251/331 X |
| 3,477,693 | 11/1969 | Bezanin | 251/331 X |
| 3,918,495 | 11/1975 | Abrahams | 251/331 X |
| 3,921,916 | 11/1975 | Bassous | 239/102 X |
| 4,013,229 | 3/1977 | Rohs | 239/533.14 X |
| 4,157,935 | 6/1979 | Solyst | |
| 4,317,559 | 3/1982 | Finkbeiner et al. | 251/331 |
| 4,455,192 | 6/1984 | Tamai | |

OTHER PUBLICATIONS

Article entitled "Fabrication of Novel Three-Dimensional Microstructures by the Anisotropic Etching of (100) and (110) Silicon" by E. Bassous, IEEE Transactions of Electron Devices, vol. ED-25, No. 10 (Oct. 1978), pp. 1178–1185.

Primary Examiner—Arnold Rosenthal
Attorney, Agent, or Firm—Peter Abolins; Keith L. Zerschling

[57] ABSTRACT

A silicon valve for controlling the flow of a fluid includes two generally planar silicon members. One has an orifice for passing the fluid and the other has a relatively moveable surface to selectively open and close the orifice thereby controlling the flow of fluid through the orifice.

1 Claim, 21 Drawing Figures

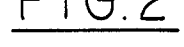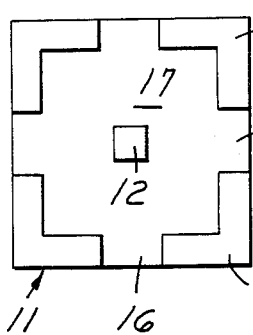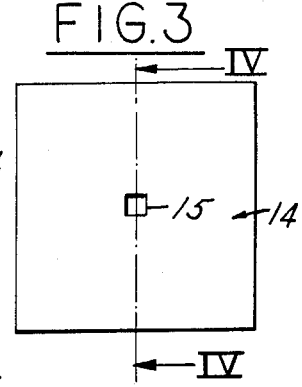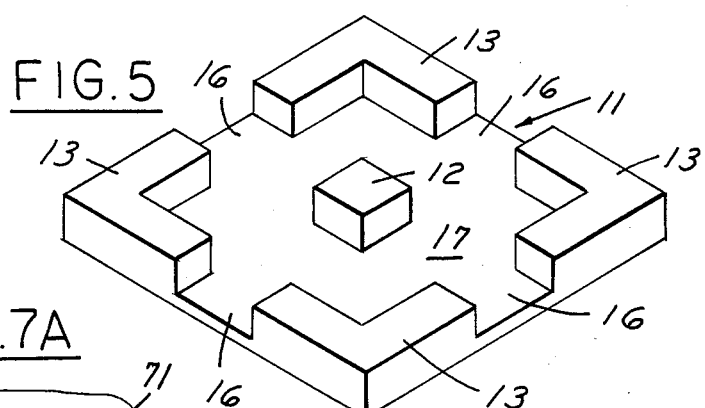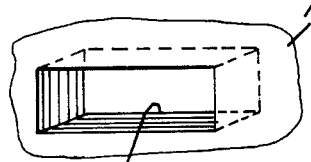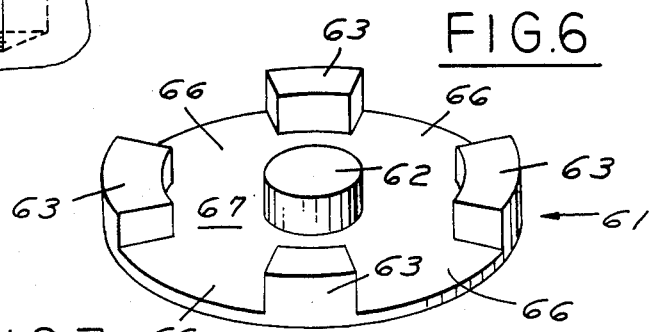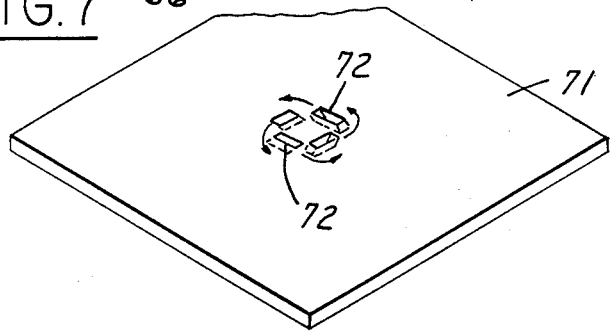

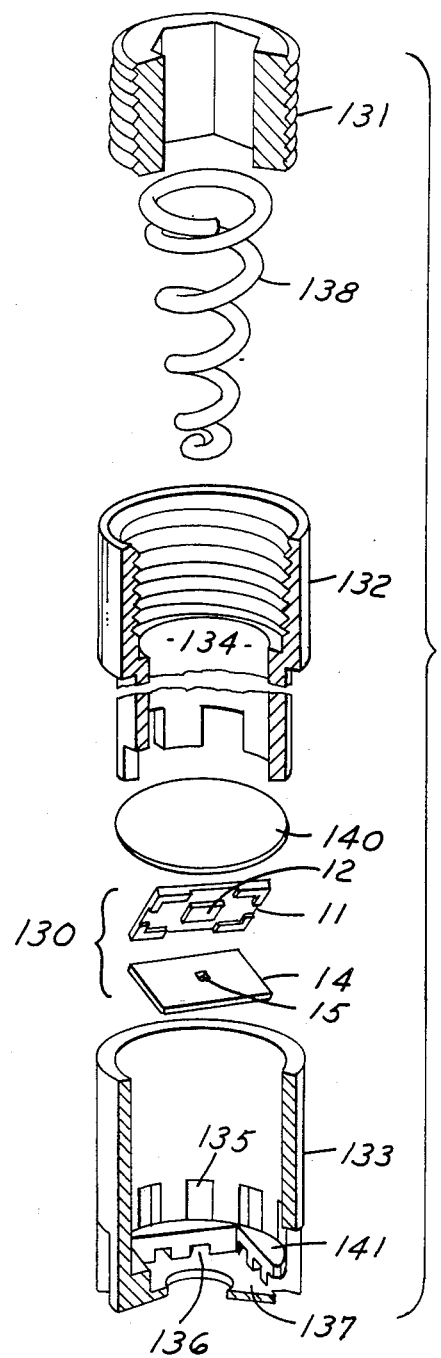

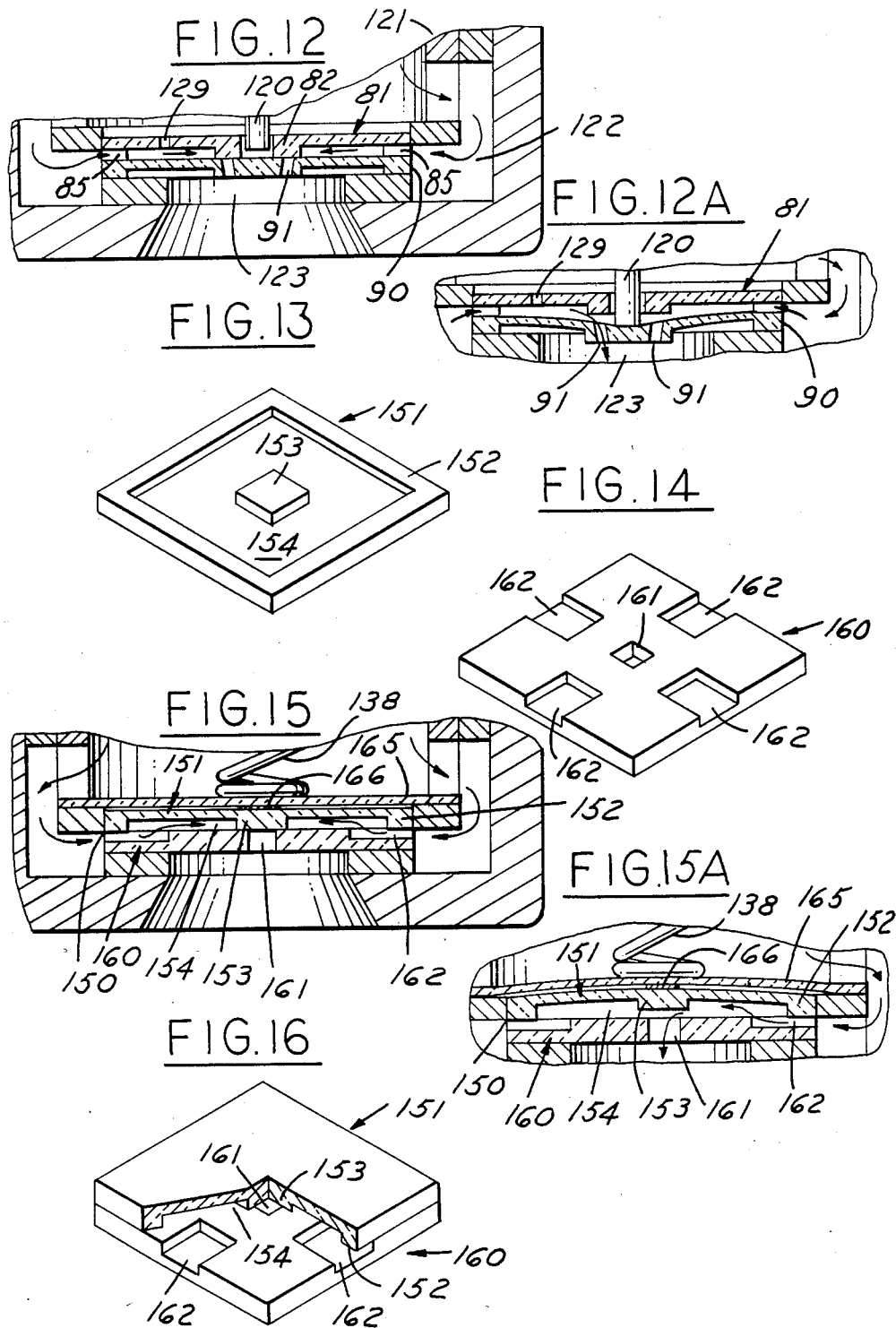

4,647,013

SILICON VALVE

TECHNICAL FIELD

This invention relates to a structure and method for chemically etching and fabricating a silicon valve structure.

BACKGROUND ART

An article entitled "Fabrication of Novel Three-Dimensional Microstructures by the Anisotropic Etching of (100) and (110) Silicon", by E. Bassous, IEEE Transactions on Electron Devices, Vol.. ED-25, No. 10, October 1978, pages 1178-85 teaches the use of anisotropic etching of single crystal silicon to make ink jet nozzles, optical waveguides, multisocket miniature electrical connector and electromechanical devices.

U.S. Pat. No. 4,157,935 issued to Solyst and U.S. Pat. No. 4,455,192 issued to Tamai teach methods of forming an ink jet nozzle array by chemical etching of a silicon wafer.

It is also known to fabricate conventional metal fluid metering valves such as those using matched fittings of very precisely machined metal components. Typical tolerances of the lapped machine parts are in the millionths of inches. This is a complicated, labor-intensive, time-consuming manufacturing process yielding components which are expensive and subject to reliability problems as the internal tolerances change due to wear and exposure to fuel and fuel contaminants. It would be desirable to fabricate fuel injectors and other valves with substantially less labor and time using a significantly less complicated manufacturing process. That is, superior tolerances are desirable as is an insensitivity to fuel contaminants and improved reliability. These are some of the problems this invention overcomes.

DISCLOSURE OF THE INVENTION

This invention teaches a silicon valve for controlling the flow of fluid using first and second silicon members. The first silicon member is generally planar and has an orifice for passing the fluid. The second silicon member has a planar silicon surface aligned with, and relatively movable to, the orifice for selectively opening and closing the orifice thereby controlling flow of fluid through the orifice.

BRIEF DESCRIPTION OF THE DRAWINGS

FIG. 1 is a plan view of a movable silicon valve member in accordance with an embodiment of this invention;

FIG. 2 is a side view of FIG. 1;

FIG. 3 is a plan view of a silicon valve member including a nozzle orifice for use in connection with the member of FIG. 1 in accordance with an embodiment of this invention;

FIG. 4 is a section along section line IV—IV of FIG. 3;

FIG. 5 is a perspective view of the member of FIG. 1;

FIG. 6 is an alternative embodiment of the member of FIG. 1 using a circular instead of a square shape;

FIG. 7 is an alternative embodiment of the valve member of FIG. 3 using four nozzle openings instead of one opening;

FIG. 7A is an enlarged view of a portion of a plan view of the member of FIG. 7 including a nozzle orifice which is etched obliquely through the member with respect to the planar surface of the member;

FIG. 11 is an exploded perspective, partly cut-away view of a fluid metering valve using a silicon valve in accordance with an embodiment of this invention;

FIG. 12 is an enlarged section view of the valve portion of a fluid metering valve using the valve shown in FIG. 8 with a plunger passing through the central opening in the top silicon valve member and showing a fluid path by arrows to the sealed nozzle openings in the bottom silicon valve member;

FIG. 12A is a view similar to FIG. 12 with the plunger depressed and the bottom silicon valve member deflected opening up a fluid path through the nozzle openings in the bottom silicon member as indicated by arrows;

FIG. 13 is a bottom perspective view, similar to FIG. 5, of a top silicon valve member in accordance with another embodiment of this invention;

FIG. 14 is the top perspective view of a bottom valve member including a nozzle orifice for use in cooperation with the top silicon valve member of FIG. 13;

FIG. 15 is a cross section view of a silicon valve using the members shown in FIGS. 13 and 14 assembled in a fuel injector showing fluid path by arrows;

FIG. 15A shows the valve structure of FIG. 15 in a deflected position permitting fluid to pass through the bottom silicon member as indicated by arrows showing fluid flow; and FIG. 16 shows a perspective, partly broken away, view of the silicon valve members of FIG. 15.

BEST MODE FOR CARRYING OUT THE INVENTION

Figure 8:
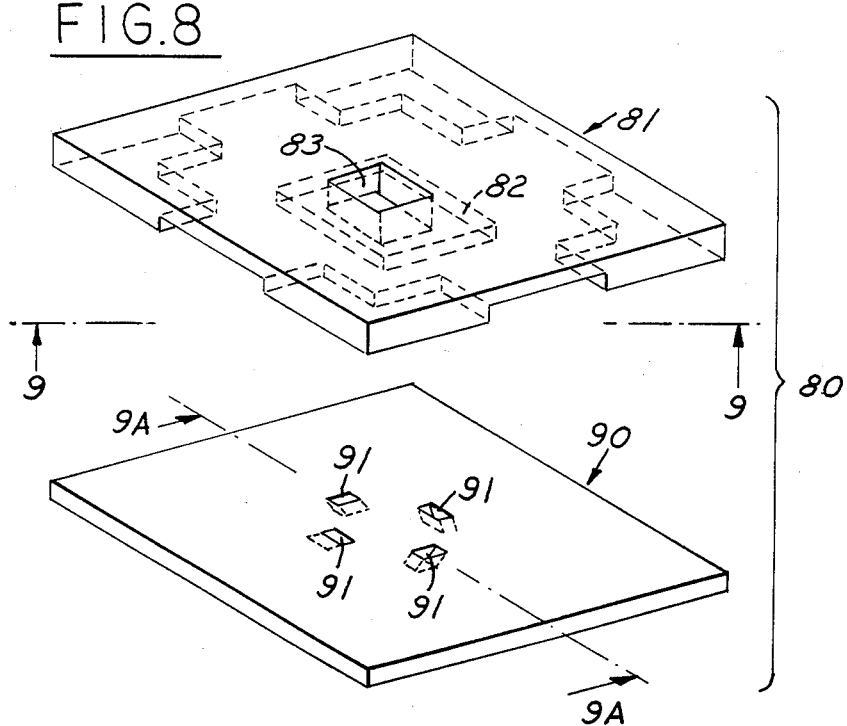
FIG. 8 is an exploded perspective view of two members of a silicon valve including a bottom valve member as shown in FIG. 7, and a top silicon valve member in accordance with another embodiment of this invention having an opening for passing a plunger to deflect the bottom silicon valve member.

A silicon valve includes a planar, upper silicon valve member 11 having a raised central mesa 12, a sectional wall perimeter 13, and a flexible membrane 17 intermediate central mesa 12 and wall perimeter 13. Four passages 16 are located between sections of wall perimeter 13 to permit fluid flow across wall perimeter 13, (see FIGS. 1 and 2). The silicon valve also includes a generally planar lower silicon wafer 14 having a nozzle orifice 15 aligned with mesa 12 (see FIGS. 3 and 4). The silicon valve operates by positioning silicon members 11 and 14 adjacent each other so that mesa 12 covers nozzle orifice 15. When member 11 is deflected and mesa 12 is spaced from opening 15, fluid can flow in from the side through passages 16 between the portions of wall perimeter 13 and out through nozzle orifice 15. FIG. 16 provides an assembled, perspective, partly broken away view in accordance with another embodiment of this invention wherein the passages for permitting fluid flow across the perimeter wall are located in the lower silicon valve member. Silicon members 11 and 14 are each formed by etching from generally planar silicon wafers advantageously having a planar optical surface. The raised wall perimeter 13 around the edge of silicon member 11 can have an additional passage opening for increasing the flow of fluid between silicon members 11 and 14 to orifice 15. If desired, the thickness of silicon member 11 adjacent passage 16 can be thicker than at membrane 17 to provide structural reinforcement Referring to FIG. 6, a silicon member 66 has a generally circular shape with a raised central circular mesa 62, generally arcuate sections forming a sectional wall perimeter 63 with radial passages 66, and an annular membrane 67 between mesa 62 and wall perimeter 63.

Referring to FIG. 7, an alternative embodiment of the lower silicon member 14 can be a silicon member 71 having four nozzle orifices 72 which are adapted to be aligned with either a large single or a plurality of smaller mesas to selectively regulate the flow of fluid. Advantageously, each nozzle orifice 72 is formed in an oblique angle through silicon member 71 so that fluid flowing through nozzle orifices 72 is given a swirl.

FIG. 7A shows an enlarged plan view of a nozzle orifice 72 with the angling shown in two directions. The angling provides a spray or swirling to the fluid as to exits nozzle 72 which is particularly desirable when atomization of the fluid is important. This feature may be used advantageously when injecting fuel into a combustion cylinder. Anisotropic etching of silicon is a particularly advantageous way of forming such angled nozzle openings. Silicon is a desirable material to use because it is resistant to attack by most fluids, exclusive of strong bases. Further, single crystal silicon for use as the flexible valve member is advantageous because there is no intrinsic fatigue mechanism.

Figure 10:
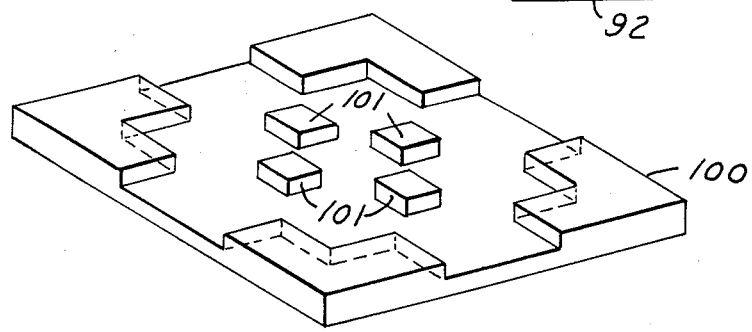
FIG. 10 is a bottom perspective view of a top valve member in accordance with another embodiment of this invention for use in conjunction with the bottom plate of FIG. 8.

FIG. 10 shows the bottom perspective view of a top member suitable for use with bottom silicon member 71 of FIG. 7 wherein a silicon member 100 has four central mesas 101 which are aligned with and are sufficiently large enough to cover nozzle orifices 72 of silicon member 71.

Referring to FIG. 8, a silicon valve 80 includes an upper silicon member 81 having a raised central mesa 82 with an opening 83 therethrough. Silicon member 81 further includes four corner wall-like perimeter portions 84 with intermediate passages 85 for passing fluid. Passages 85 extend up to mesa 82. A lower silicon member 90 has four nozzle orifices 91 aligned to be covered by raised mesa 82. Valve 80 operates as shown in FIGS. 12 and 12A by having a plunger 120 extend through opening 83 in upper silicon member 81 to push against a central portion of lower silicon member 90 thereby uncovering nozzle orifices 91 from mesa 82 and permitting fluid to flow through nozzle orifices 91.

Figure 9:
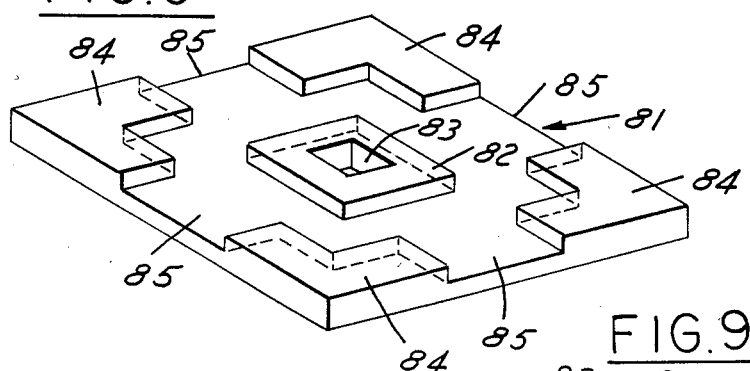
FIG. 9 is a bottom perspective view of the top valve member of FIG. 8.
Figure 9A:
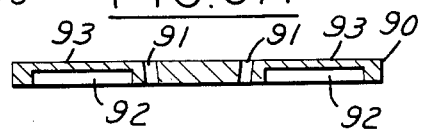
FIG. 9A is a cross section view of the bottom valve member of FIG. 8 along section line 9A—9A.

Referring to FIG. 9A, a section view of lower silicon member 90 includes an annular trough 92 formed in the bottom of lower silicon member 90 around nozzle orifices 91 so as to form a membrane 93 of reduced thickness. This permits the central portion of silicon member 90 with nozzles 91 to be deflected when plunger 120 presses down on the central portion of silicon member 90.

Referring to FIG. 12, when valve 80 is mounted in a fuel injector 121 a fluid flow path 122 is aligned with passage 85 of upper silicon member 81 so that the fluid path reaches central mesa 82. However, when lower silicon member 90 is undeflected, central mesa 82 covers nozzle orifices 91 and stops fluid flow from continuing to a passage 123 below the central portion of lower silicon member 90.

Referring to FIG. 12A, plunger 120 has moved downward so as to deflect the central portion of lower silicon member 90 thereby permitting fuel to flow through nozzles 91 into lower passage 123.

The plunger 120 shown in FIGS. 12 and 12A can be of a piezoelectric material which expands in response to the application of electric current. Thus, the length of plunger 120 increases and causes it to downwardly deflect central portion of lower silicon member 90.

FIGS. 12 and 12A also illustrate an optional additional fluid flow passage 129 through the thickness of upper silicon member 81 which can pass fluid and is in communication with nozzles 91 when lower silicon member 90 is deflected downward.

Figure 11A:
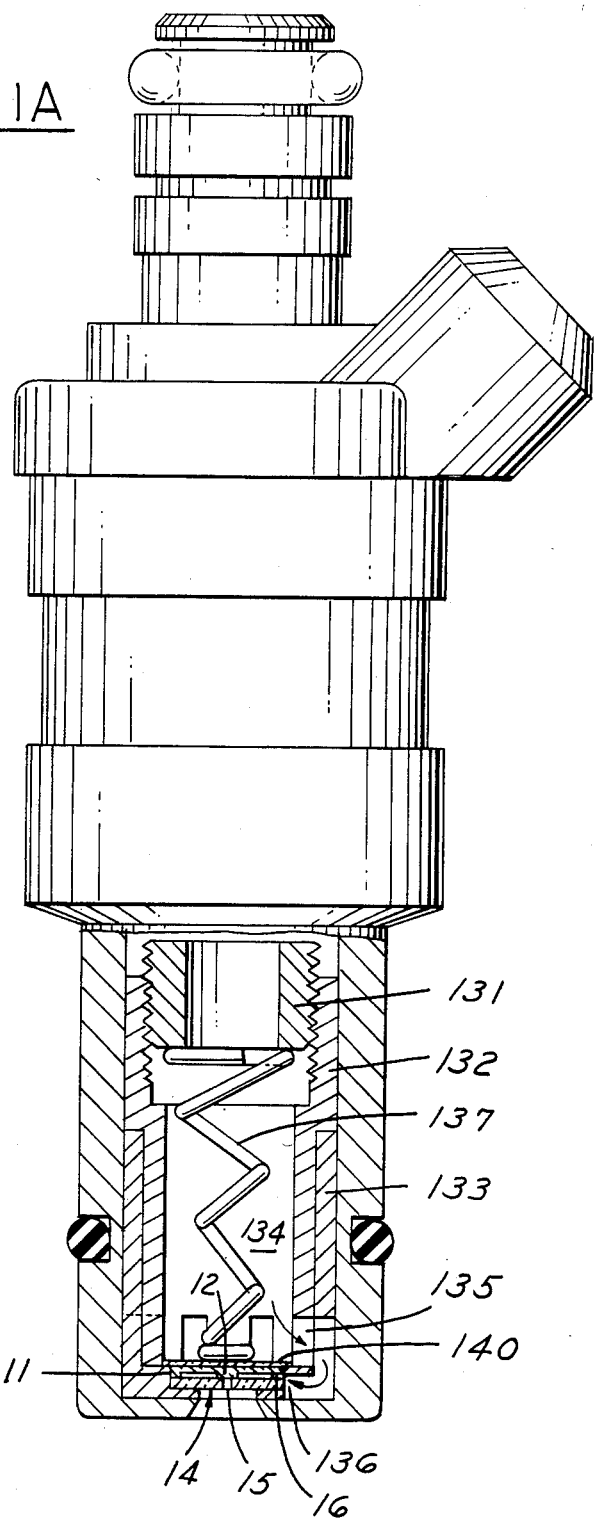
FIG. 11A is a side, partly section, view of a fuel injector in accordance with an embodiment of this invention.

Referring to FIGS. 11 and 11A, there is shown an exploded and an assembled view of a fuel injector, respectively, in accordance with an embodiment of this invention. The silicon valve 130 can use members such as upper silicon member 11 and lower silicon member 14 as shown in FIGS. 1 and 3, respectively. The injector has injector body portions 131, 132 and 133 for providing a central fuel path and supporting valve 130. Member 132 has a central fuel path 134 which passes fuel to side openings 135 and into side radial openings 136. A generally square seat 137 receives the bottom of lower silicon member 14. A generally circular seat 141 receives a circular piezoelectric bimorphous wafer element 140 which is attached to upper member 11 and can deflect upper member 11. Passages 16 of upper silicon member 11 are aligned to receive fuel from radial openings 136. A spring 137 keeps mesa 12 abutted against nozzle 15 to prevent fuel flow. A return spring 138 applies a downward force to piezoelectric element 140. On actuation of the injector of FIG. 11, the spring force is overcome by application of electrical energy to piezoelectric bimorphous wafer element 140 which causes upward deflection of the central portion of upper silicon member 11 and clears mesa 12 from nozzle 15 thereby permitting fuel flow. Return spring 137 applied to the piezoelectric member causes the flexible member to close when the electrical energy is removed. FIG. 11A shows an assembled view substantially similar to FIG. 11.

An alternative embodiment of valve 130 using wafers similar to upper silicon wafer 11 and lower silicon wafer 14 is shown in FIGS. 15 and 15A. The upper member of a valve 150, shown in FIG. 13, has an upper silicon member 151 having a wall-like continuous perimeter 152, a raised central mesa 153 and a thinner membrane 154 intermediate raised central mesa 153 and perimeter 152.

Referring to FIG. 14, the top respective view of a bottom silicon member 160 to be used in conjunction with upper silicon member 152 is shown. A central nozzle orifice 161 is formed through lower silicon member 160. Side fluid flow channels 162 are formed in each of the four sides of lower silicon member 160 so that there is a reduced thickness of silicon member 160. As can be seen in FIG. 15, the extent of fluid channel 162 toward nozzle orifice 161 is greater than the width of perimeter wall 152 so that fluid can pass through channel 162 adjacent membrane 154 up to central mesa 153. An assembled view of the elements of FIGS. 13 and 14 is shown in FIG. 16. This view and others show the valve plates substantially thicker than actual for clarity.

Referring to FIG. 15, the valve does not permit fluid flow through nozzle orifice 161 when mesa 153 closes it off. A piezoelectric diaphragm 165 is attached to upper silicon member 152 by a silicon attachment 166. FIG. 15A shows activation of piezoelectric diaphragm 165 which causes upper silicon member 152 to deflect thereby raising mesa 153 from nozzle orifice 161 of lower silicon member 160. This permits fluid flow through channel 162, adjacent membrane 154 and through nozzle orifice 161.

A typical fabrication sequence for manufacture of a silicon valve, such as that shown in FIG. 16, is as follows:

Top plate fabrication (including a mesa seat and a reduced thickness diaphragm) includes the steps of cleaning half wafers (2" wafers cut in half), growing an oxide of 1 micrometer thickness, stripping the backside oxide from the wafers, depositing boron to define a diaphragm, removing boron-silicate glass (BSG), growing oxide (at least 2000Å), defining a valve seat pattern in oxide, etching the wafer in EDP (an anisotropic etchant), and etching the remaining $SiO_2$ in buffered HF for about 5 minutes.

Bottom plate fabrication (i.e. the orifice plate) includes cleaning a wafer, growing an oxide (at least 2000Å), forming an oxide pattern on the top side to define the orifices, etching the wafer in EDP, cleaning the wafers, growing an oxide, forming a backside oxide pattern for an orifice and plate size, etching the wafer in EDP, and removing the remaining $SiO_2$ with BHF.

When both top and bottom plates are complete, they are bonded together to form the valve so that a wall portion of the top silicon member is coupled to the surface of the bottom silicon member and a surface of the top silicon member is relatively moveable with respect to the orifice in the bottom silicon member for sealing the orifice to stop the passage of fluid and for being spaced from the orifice for permitting the passage of fluid through the orifice.

Various modifications and variations will no doubt occur to those skilled in the various arts to which this invention pertains. For example, the particular size and shape of the mesa, raised perimeter and/or the orifice may be varied from that disclosed herein. Also, the size and shape of the silicon members (round, square, triangular, etc..) may be varied from that disclosed herein. These and all other variations which basically rely on the teachings through which this disclosure has advanced the art are properly considered within the scope of this invention.

We claim:

1. A silicon valve for controlling the flow of a fluid including:
    a first generally rigid planar silicon member having an orifice for passing the fluid; and
    a second silicon member having a rigid planar silicon surface aligned with and relatively moveable to said orifice for selectively opening and closing said orifice thereby controlling the flow of fluid through said orifice, said second silicon member including:
    a thicker mesa means having a flat top for sealing said orifice;
    a raised perimeter portion means for coupling to said first silicon member;
    membrane portion means peripheral to said mesa means for providing said second silicon member with increased flexibility so that said mesa means can be positioned to seal said orifice to stop fluid flow and can move away from said orifice to permit the passage of fluid through said orifice; and
    a fluid passage means in said perimeter portion means for permitting the passage of fluid past said perimeter portion means.

* * * * *